United States Patent [19]

McMahon

[11] 3,818,243

[45] June 18, 1974

[54] ERROR CORRECTION BY REDUNDANT PULSE POWERED CIRCUITS

[75] Inventor: Robert E. McMahon, Dunstable, Mass.

[73] Assignee: Massachusetts Institute of Technology, Cambridge, Mass.

[22] Filed: Jan. 12, 1973

[21] Appl. No.: 323,003

Related U.S. Application Data

[63] Continuation of Ser. No. 225,066, Sept. 9, 1971, abandoned, which is a continuation of Ser. No. 703,365, Feb. 6, 1968, abandoned.

[52] U.S. Cl. ............. 307/219, 307/204, 307/221 R, 307/224 R, 307/238

[51] Int. Cl. ........................ G06f 11/08, H03k 19/08

[58] Field of Search ........... 307/204, 219, 221, 223, 307/224, 238; 328/37

[56] References Cited

UNITED STATES PATENTS

| | | | |
|---|---|---|---|
| 2,946,900 | 7/1960 | Steinman et al. | 307/219 |
| 3,069,562 | 12/1962 | Steele | 307/204 |
| 3,116,477 | 12/1963 | Bradbury | 307/219 |
| 3,117,237 | 1/1964 | Grady et al. | 307/219 |
| 3,316,426 | 4/1967 | Imahashi | 307/224 R |
| 3,321,639 | 5/1967 | Fowler et al. | 307/219 |
| 3,510,689 | 5/1970 | Baker | 307/238 |

*Primary Examiner*—Stanley D. Miller, Jr.
*Attorney, Agent, or Firm*—Arthur A. Smith, Jr.; Martin M. Santa; Robert Shaw

[57] ABSTRACT

A redundant circuit which utilizes pulsed power techniques to achieve low power and high reliability by automatic error correction, through the interconnection of capacitors of the various redundant circuit elements.

8 Claims, 6 Drawing Figures

INVENTOR
ROBERT E. MC MAHON
BY,
Richard F Benway
ATTORNEY

INVENTOR
ROBERT E. MC MAHON
BY
Richard F Bonnaway
ATTORNEY

INVENTOR
ROBERT E. MC MAHON
BY,
Richard F. Benway
ATTORNEY

ERROR CORRECTION BY REDUNDANT PULSE POWERED CIRCUITS

This application is a continuation of application Ser. No. 225,066 filed Sept. 9, 1971, now abandoned, which is a continuation of application Ser. No. 703,365 filed Feb. 6, 1968.

The invention herein described was made in the course of work performed under a contract with the Electronic Systems Division, Air Force Systems Command, United States Air Force.

This invention relates to redundant circuits and more particularly to redundant circuits utilizing pulsed power techniques.

Pulsed power techniques are fully disclosed in pending patent application entitled "Pulse Powered Circuits," by R. H. Baker, Ser. No. 591,231, now U.S. Pat. No. 3,510,689. That patent application discloses a pulse power technique of operating digital components. The technique disclosed in that application requires that the supply voltage be gated to the digital elements only during a clock interval. Relatively high speed elements are used. The elements are composed of a pair of two input nand-nor gates. When cross coupled, the gates form a reset flipflop and have typical clock rates of less than 1 microsecond. The states of the digital elements between clock intervals are stored and reestablished during the next clock interval by means of capacitors. Associated gate circuits operating with the capacitors first provide a charging period during the "on" time of a circuit and then a holding period when the power is "off."

The present invention is an extension of this concept. In the preferred embodiment of the present invention, more than one element is used. Preferably three elements are used. Interconnecting these redundant elements by appropriate capacitors permits commercial digital integrated circuits to operate reliably on a few microwatts, although their usual operating power level is several milliwatts. Furthermore, the capacitor interconnection scheme provides immediate, automatic error-correction by a reliable majority charge technique. The very high reliability provided by the simple expedient of interconnecting various redundant pulse powered elements by capacitors permits the ultimate in reliability on a minimum of power requirements.

If one of the capacitors or the redundant element to which it is interconnected short circuits, automatic correction is provided, and even if there is an open circuit, which is the most prevalent possibility, correction is also provided. Normally, at the end of a redundant circuit, a majority gate, which is quite expensive, is necessarily provided. The present invention obviates this necessity. Accordingly, redundant elements can be strung together in a large quantity and at the end the majority gate will not be required, as prior art indicates.

An object of the present invention is to provide a high reliability, low power redundant circuit configuration.

Another object of this invention is to provide a redundant pulse powered circuit configuration wherein automatic correction is provided between redundant circuit elements.

Another object of this invention is to provide a pulse powered redundant circuit element configuration which does not require a majority gate.

Further objects, features and advantage of the present invention will be better understood from the following specifications, when read in conjunction with the attached drawings, of which:

Figure 1:
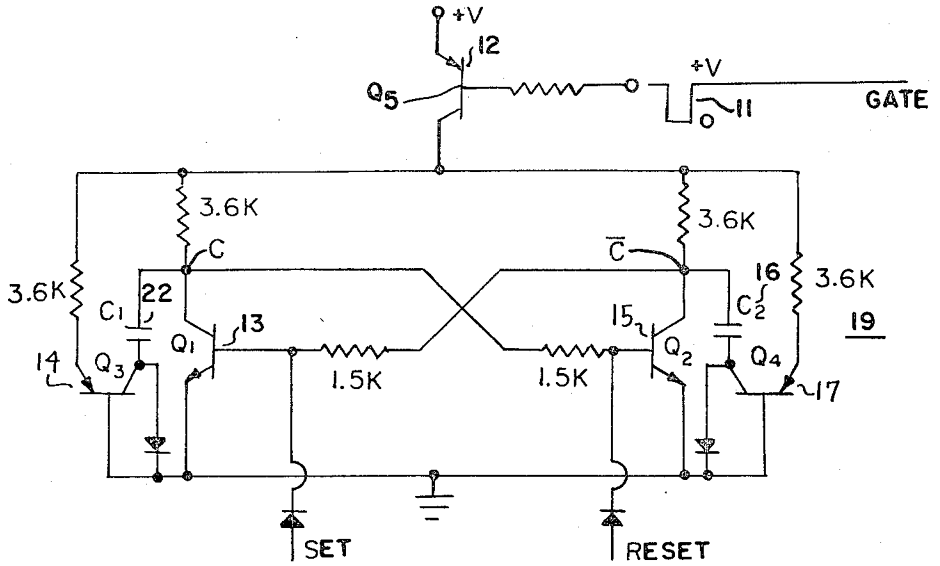
FIG. 1 is a circuit diagram of the prior art pulse powered circuit.
Figure 4:
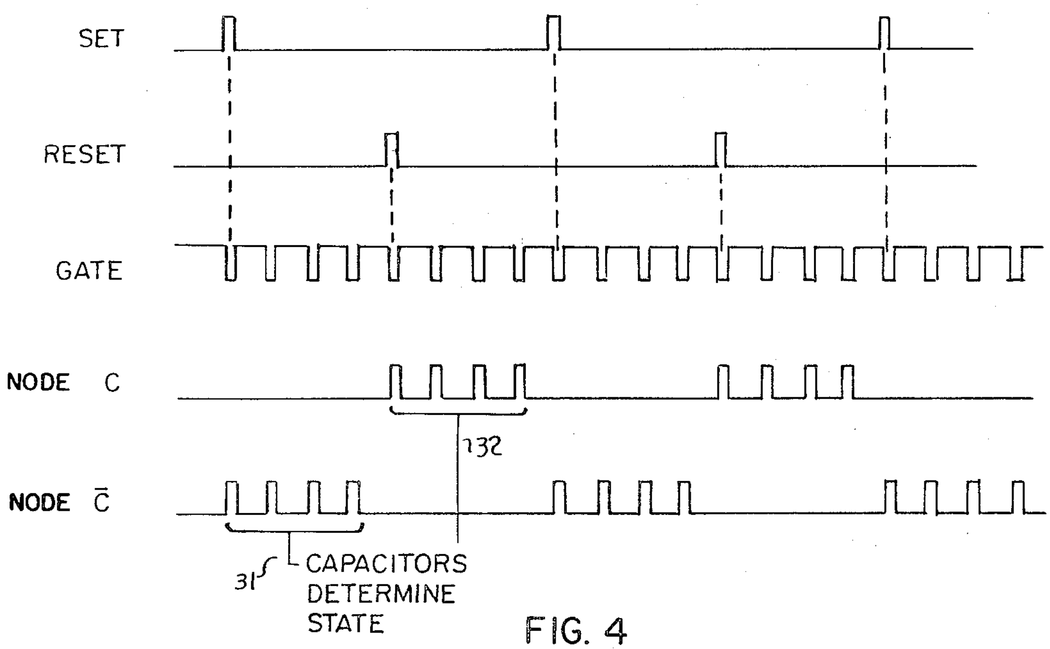
FIG. 4 shows the waveforms as applied to the circuit of FIG. 1.

FIG. 1 shows a typical integrated circuit element that has been designed for pulsed power operation. Transistor $Q_1$ 13 is turned on by the first set pulse, which is shown in the waveform diagram, FIG. 4 and transistor $Q_2$ 15 is turned off during the active period allowed by power gate $Q_5$ 12. Capacitors $C_1$ 22 and $C_2$ 16 are charged according to the voltages at the collectors to which they are respectively connected, since both gate transistors $Q_3$ 14 and $Q_4$ 17 are on during the gated power interval.

At the end of the power gate clock pulse 11, the voltage is removed from the flipflop, returning the capacitor gate to an off condition. At this point, the state of the flipflop is represented by the charge on capacitors $C_1$ and $C_2$ and no additional power is required during the off period. The amount of charge lost during the off period is proportional to the leakage current of gate transistors $Q_3$ 14 and $Q_4$ 17. At the next application of power to the circuit through $Q_5$ 12, the remaining charge in capacitors $C_1$ and $C_2$ triggers the flipflop through its collector connection and reestablishes the flipflop state. Even with capacitors as small as 100 picofarads, the allowable ratio of off to on time intervals will be several orders of magnitude, thereby reducing the required circuit power to lower values. The digital elements operate reliably in the gated power mode at a few microwatts, although their usual level is on the order of 30 milliwatts. The circuit in FIG. 1 is the basic circuit element described in the above mentioned Baker application. The circuit diagram in FIG. 1 shows the various resistance and capacitive. In the present invention flipflop element 19 of the type GME134R manufactured by Micro Electronics Division of the Philco-Ford Corporation at Santa Barbara, California, is recommended. From the wave diagrams shown herein, it can be seen that the capacitors $C_1$, $C_2$ determine the state of the element at nodes 5, 6, respectively.

Figure 2:
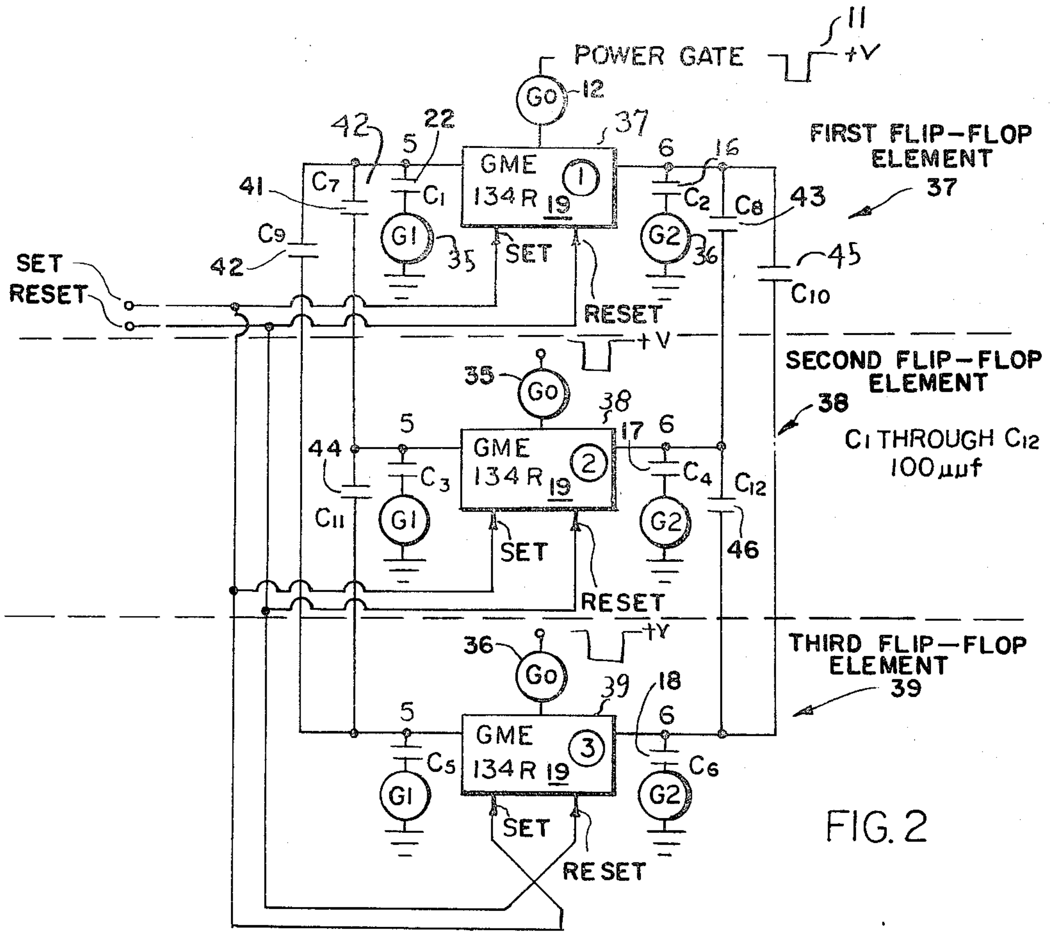
FIG. 2 is a three-level redundant flipflop circuit with automatic error correction.
Figure 5:
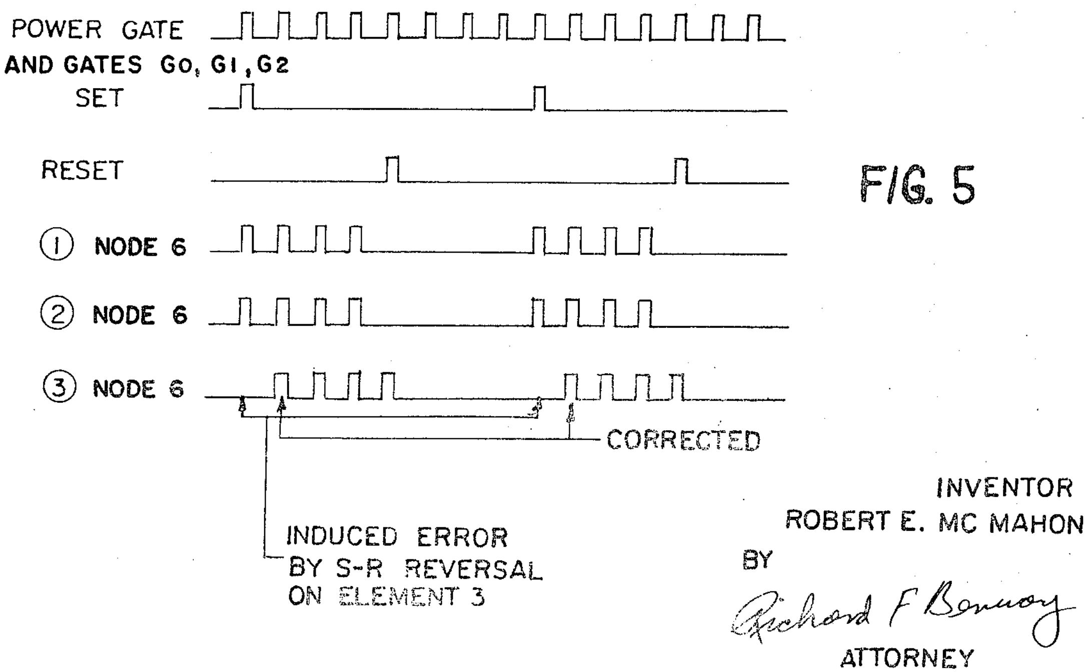
FIG. 5 shows the waveforms as applied to the circuit of FIG. 2.

FIG. 2 shows the basic features of the invention. This includes three circuit elements 19 of the sort shown in FIG. 1 in a redundant combination. These circuit elements referred to as first, second and third flipflop circuit elements have their storage capacitors interconnected. Each circuit element 19 also has an interconnecting capacitor 41–46 to each of circuit elements in the combination. Thus, the elements are identical redundant elements, and accordingly, power gate and the reset pulses are applied to each in an identical fashion. However, for the purposes of illustration, the last element has the set-reset pulses interchanged to introduce an error deliberately for the purposes of illustration. Capacitors $C_1$ 22 and $C_2$ 16 store the state of the flipflop as described in FIG. 1. The flipflop circuit element 37 is gated by power gate 12 in the same manner as it was operated and described in FIG. 1. All three elements are identical and have identical storage capacitors; each storage capacitor is 100 microfarads and is gated on simultaneously, that is, gates $G_1$ 35, $G_2$ 35, $G_2$ 36 at the same time as gate $G_2$ 12. FIG. 5 is a wave diagram showing the various pulses applied to the circuit. Capacitors 41, 42, 44, 45, 46, and 43 are the error-correcting capacitors. From an examination of the wave diagrams, it is seen that the power gate and set-reset of the various elements produce repeated signals in the combination at the first and second elements 37 and 38; however, the first pulse has an induced error on the third element 39 which is quickly corrected by means of the interconnected capacitors. Capacitors $C_2$ 16, $C_4$ 17 and $C_6$ 18 have charges which determine the state of the corresponding flipflop element in accordance with the pulse powered manner of operation. The capacitors $C_8$ 43, $C_{10}$ 45 and $C_{12}$ 46 cause a distribution of charge, determined by the majority of the circuit and accordingly, if, for example, the first flipflop 37 and the second flipflop 38 each have the same given charge on their storage capacitor and the third flipflop 39 has an opposite charge, which is in disagreement with the other two or majority, after the second pulse all will conform to the common charge and, thus, the error is corrected.

The interconnecting capacitors between the redundant flipflop circuit elements cause a distribution of the charge of all the storage capacitors in a given manner. If there is an open circuit which produced the error in, for example, the third flipflop circuit element or a short circuit is produced in this circuit, both of these malfunctions would be met and corrected in the same manner as described above, because the interconnecting capacitors would distribute the charge and force the pulse output to agree with the other two or majority of the flipflop circuit element.

Figure 3:
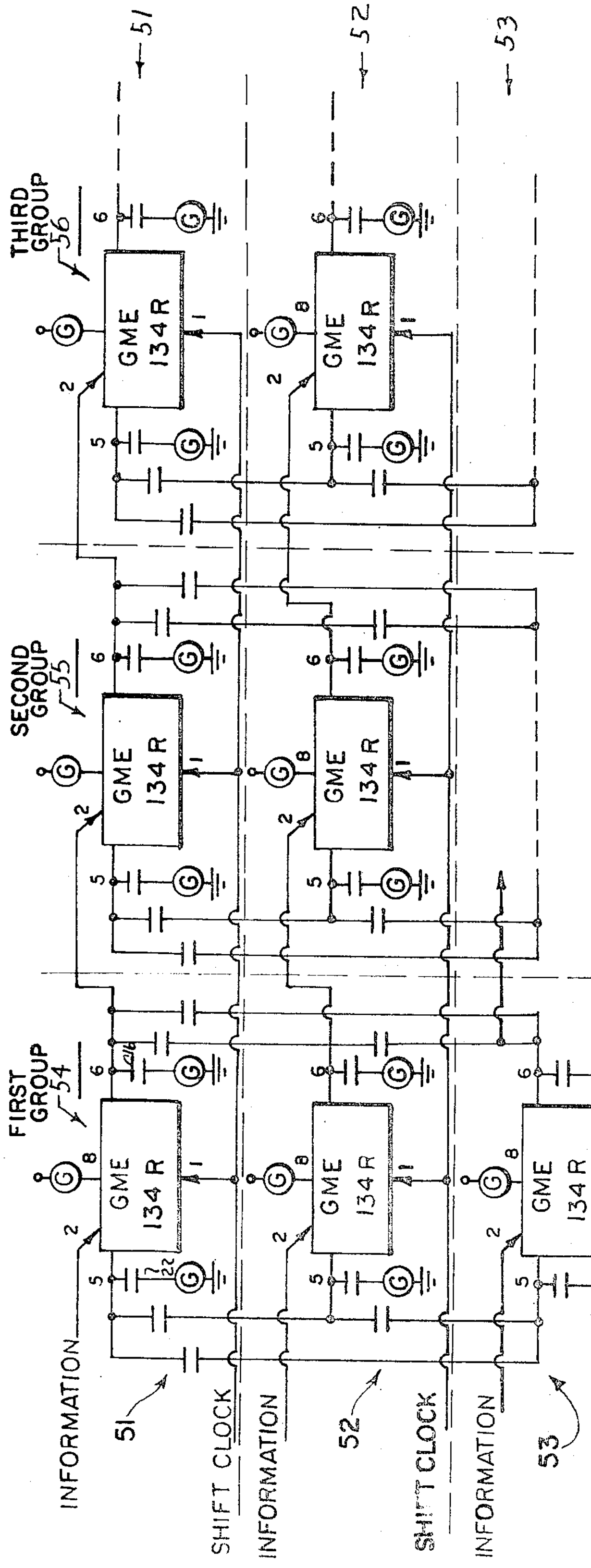
FIG. 3 is a shift register embodying the principle of the present invention.

In substance, the invention lies in an automatic error correction resulting from a distribution of charge in the various storage elements, by means of the interconnecting capacitors. A logical extension and application of the present invention would reside in a circuit wherein the digital elements made up a shift register, which is a typical configuration. FIG. 3 shows such a typical application. Here is shown three redundant channels 51, 52 and 53 of a shift register which could normally without redundancy consist of merely channel 51. As the information is placed upon the first group of redundant elements 54, interconnected as the elements in FIG. 2, the state of the flipflop would be determined by the capacitor charge on capacitor 16 or capacitor 22, likewise with the corresponding digital element in channels 52 and 53, the states of these flipflops would also be determined by the charge in the corresponding storage capacitors. If an error occurs on any one of the elements of the group, it will be corrected automatically when the circuit is reenergized, as explained above with respect to FIG. 2. A decided advantage is gained by the present invention. For example, consider the first stages or group 54 of this shift register redundant and note that an error that may have resulted from a defective flipflop in the group elements would be corrected automatically so this error would not be shifted down to the next flipflop station or group to one of the elements in group. Accordingly, if a new error is produced in one of the flipflops that make up a redundant station, it will be corrected automatically before being shifted down to the next redundant element in the next station of the shift register. This action provides a substantial advance over the state of the art. Heretofore, in the conventional redundant circuit configuration an error in the first group of redundant elements, would be shifted down to the second group and these could combine with another error in the second group and these two errors would be shifted down to the final station where the error would be the majority and then the majority gate would indicate an error. With the present invention, when each station is automatically corrected, errors cannot accumulate and so the probability of failure is reduced by a considerable margin. Another decided advantage of the present invention over the prior art arises as follows: Heretofore, at the end of the register there must be a majority gate in order to determine the state of the shift register. This is not needed with the present invention, because each and every station including the last station is automatically corrected and all three shift registers produce the same final signal, which is the correct signal. Accordingly, any one of the shift registers in parallel can be sampled and it will indicate what the output should be.

Figure 6:
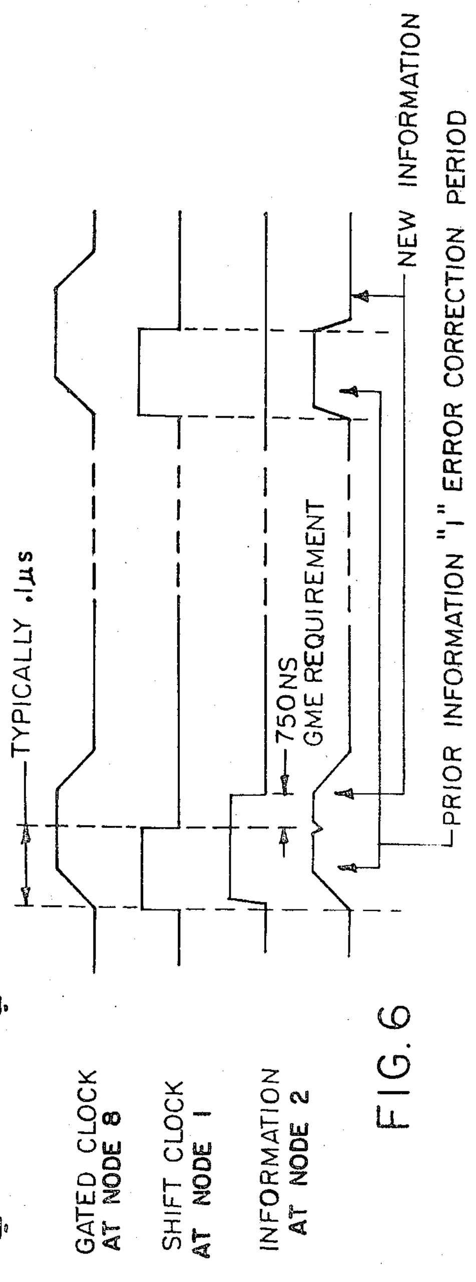
FIG. 6 shows the waveforms as applied to the circuit of FIG. 3.

Referring to FIG. 6, there is shown typical wave diagrams. The gated clock requires a certain period of time to turn the elements on and to remain on in order for the circuit to respond. The gate clock has a central point at approximately 1/10 of a microsecond after the initiation of shift clock. The shift clock is on for 1/10 of a microsecond. Beyond this 1/10 of a microsecond period, an interval of 750 nanoseconds is required for the information to be recorded, and automatic error correction to be made. By the time the next shift occurs, the new information will have been recorded. Thus, the period for error correction is demonstrated to be very small. Although the correction technique is primarily designed for systems operating in a fixed repetition rate, adequate margins exist for changes in repetition rate over a wide range. For example, elements in a three-level redundant shift register operate satisfactorily at repetition rates ranging from 20 milliseconds to 2 microseconds, and provide error correction despite voltage variations of 2.5 volts to 6 volts. The advantages of this error correction technique are quite clear. Correction takes place within each stage prior to a shift so that errors are not propagated throughout the shift register. Practical tests on small systems using the redundant error correction design indicate that operation is reliable even under adverse conditions, including worst case component values $\pm$ 30 percent variations in power supply voltage and clock timing variations. The noise immunity of the pulse power mode of operation is inherently high because noise is only effective during the clock period. In addition, since the commercial integrated circuits have relatively low input impedances and must be driven rather hard, errors induced by system noise are not likely to compete successfully with the proper input signals. Coupled with these advantages, the error correction features of the system reduce the probability of error to an extremely low level. For applications at very low repetition rates, the need for large capacitors can be avoided by employing an idling clock that operates at a multiple of the main clock frequency. The reduction in power to micro-power levels balances any disadvantages resulting from operating above the basic low repetition rate.

For very severe environments, such as exposure to radiation, where sufficient margins cannot be conveniently obtained by a choice of capacitor values and maximum leakage specifications, an adaptive mode of operation can be used with little additional complexity. In such cases, the idling clock can be controlled by sensing the leakage of a typical gate transistor in the circuit. Any degradation and leakage that might influence the reliability of the restoring capacitors can be offset by an increase in clock rate by means of a feedback circuit.

While the description of the present invention included herein is with reference to particular apparatus, the invention is not to be limited thereby, but only by the appended claims.

What is claimed is:

1. A pulse power redundant circuit comprising:

a multiplicity of digital flip-flop elements, said digital elements forming at least three redundant channels for input pulses, a source of pulsed power connected to the power input terminal of each flip-flop element for periodically simultaneously energizing all of said redundant digital elements, each of said elements having a pair of capacitors for storing the state of said digital element one at the input terminal and one at the output terminal of each element and a capacitor coupling each storage capacitor at the input terminal and output terminal of each element to the corresponding storage capacitor at the input and output terminals, respectively, of said redundant digital elements, whereby said redundant elements are all maintained in the binary state of the majority of said elements between power pulses.

2. A pulse power redundant circuit according to claim 1 wherein, said corresponding capacitors for storing the state of each element are all equal to each other.

3. A pulse power redundant circuit according to claim 2 wherein, all said elements are the same and all the coupling capacitors are equal to each other.

4. A binary redundant circuit as in claim 1 wherein, all the coupling capacitors which couple corresponding storage capacitors are equal to each other.

5. A binary redundant circuit comprising, a multiplicity of digital flip-flop elements, said digital elements forming at least three redundant channels for input pulses, a source of input power pulses, connected to the input power terminal of each digital element for periodically energizing all of said redundant digital elements, each of said elements having a pair of capacitors for storing the binary state thereof, one capacitor at the input terminal and one at the output terminal of each element and separate capacitors connected between each storage capacitor of each element to the corresponding storage capacitor of each other of said redundant elements, whereby said redundant elements are all maintained in the binary state of the majority of said elements.

6. A binary redundant circuit as in claim 5 wherein, all the storage capacitors are equal to each other and all the coupling capacitors are equal to each other.

7. A binary redundant circuit as in claim 5 wherein, all the redundant elements are identical and all the coupling capacitors are equal to each other.

8. A binary redundant circuit as in claim 5 and further including a source of pulse power for energizing all of said elements simultaneously, whereby all of said redundant elements are maintained in the binary state of the majority of said elements between input pulses.

* * * * *